United States Patent [19]
Gandl-Schiller

[11] Patent Number: 5,889,574
[45] Date of Patent: Mar. 30, 1999

[54] CLIP-ON LENS ACCESSORY FOR SPECTACLES

[76] Inventor: Elisabeth Gandl-Schiller, Ismaningerstrasse 68, 81675 Munich, Germany

[21] Appl. No.: 454,201
[22] PCT Filed: Dec. 10, 1993
[86] PCT No.: PCT/EP93/03496
§ 371 Date: Oct. 10, 1995
§ 102(e) Date: Oct. 10, 1995
[87] PCT Pub. No.: WO94/14101
PCT Pub. Date: Jun. 23, 1994

[30] Foreign Application Priority Data

Dec. 11, 1992 [DE] Germany .............................. 9216919 U

[51] Int. Cl.$^6$ ..................................................... G02C 7/12
[52] U.S. Cl. ................................................ 351/47; 351/57
[58] Field of Search .................................. 351/47, 57, 41, 351/48, 58, 44

[56] References Cited

U.S. PATENT DOCUMENTS 5,123,724  6/1992  Salk ............................................ 351/57

FOREIGN PATENT DOCUMENTS 690493  8/1951  United Kingdom ..................... 351/57

Primary Examiner—Hung Xuan Dang
Attorney, Agent, or Firm—Niro, Scavone, Haller & Niro

[57] ABSTRACT

A clip-on spectacle accessory for rimless, clip-on lenses has clasps that are directly secured to the top edge of each lens. Each clasp forms part of a holder structure for an elastic bridge that connects the clip-on lenses and provides elastic gripping action to hold the accessory to a pair of spectacles. A lower clasp is provided on each clip-on lens so that they are prevented from spreading away from the spectacles.

13 Claims, 2 Drawing Sheets

CLIP-ON LENS ACCESSORY FOR SPECTACLES

The invention relates to a clip-on spectacle accessory with rimless clip-on lenses, which are each held by a number of clasps to the spectacle lenses, wherein an upper clasp is directly secured to the top edge of each clip-on lens which at the same time forms the holding means for an elastic bridge to the other clip-on lens, such that the lateral cohesion of both clip-on lenses is determined by the upper clasps and the bridge, and a lower clasp is directly secured to the lower edge of each clip-on lens preventing the clip-on accessory from spreading away from the lenses of the spectacles, wherein the upper and lower clasp of each clip-on lens are outwardly offset with respect to the center line of the clip-on lens.

Such clip-on accessory is known from U.S. Pat. No. 5,123,724. The clasps of this spectacle accessory are formed from clip-ons which are U-shaped and grip the respective clip-on lens on both of its sides. Thereby the clip-ons form a gap between their base and the respective edge of the clip-on lens, in which gap a bridge formed from a rectangular elastic bar is inserted and glued to the spectacle accessory when adapting the spectacle accessory to the spectacles and of the person wearing it. The rectangular elastic bar thereby, as a result, fills the equally practical rectangularly formed gap to such an extent that only a small space must be filled by the glue and therefore the bridge is secured against twisting. Due to the short distance between the legs of the U-shaped clip-ons, a corresponding thickness of the respective clip-on lens is necessary, which must be able to fit into the clip-on as tight as possible, so that its solid mounting into the clip-on is ensured. The U-shaped clip-on in no way enables a later insertion of a clip-on lens thicker than its width. The filling-in of the glue into the above mentioned gap respectively requires each, an exact portioning of the glue while avoiding a smearing of the glue extending beyond the edges of the gap and onto the clip-on lens which, considering the small dimensioning of the respective components, can hardly be achieved, in any case requires extreme attention and accuracy, which in general presents a considerable hindering of a quick and problem-free adaptation, not considering the problem of a subsequent clipping of the parts to be connected while the glue has to harden. Additionally, the rectangular bar forming the bridge complicates its necessary bending during the fitting of the clip-on accessory to the pair of given spectacles, since the bridge at the same time must possibly by bent in the directions, which extend nearly diagonal to the rectangular cross-section of the bridge, whereby the rectangular cross-section of the bar impedes such a bending. A quick and problem-free adaptation of the clip-on accessory and possibly a quick replacement of the clip-on lenses, therefore is not possible with the known clip-on accessory.

A clip-on accessory on the market comprises a metal frame for each clip-on lens onto which for each clip-on lens two clasps are mounted outwardly offset from the center line of the respective clip-on lens, with which the clip-on accessory is attached to the lenses of the spectacles. Both clip-on lenses are connected to each other by means of a bridge formed from a wire respectively ending in a tube which is separately mounted to the frame of the respective clip-on lens.

From DE-Gbm 89 14 048 it is further known to provide individual clip-on lenses which respectively comprise three clasps in a frameless embodiment, with which respectively each clip-on lens is attached to a spectacle lens. A connection between both clip-on lenses for spectacles is not provided. The three clasps are mounted to the clip-on lens either by means of pins penetrating the clip-on lens or are glued to the clip-on lens.

The invention is based on the object of providing a clip-on accessory for spectacles, which is extremely easy to manufacture and which can be put together from pre-formed individual components in accordance to the corresponding spectacles without great expenditure and which also allows a later replacement by different clip-on spectacle lenses.

According to the invention this is achieved in that the bridge is formed from an elastic metal wire, which ends at both ends within holders arranged at the top edge of the corresponding clasps.

Due to the metal wire connected to the corresponding clasp by means of the holder, on the one hand, a pre-formed component in the form of a bridge and the two clasps arranged at both ends is presented to the optician, so that a finished component is presented for the adapting to the spectacles. Thereby, it simply has to be ensured that for different types of spectacles a number of groups of components consisting of bridge and clasps are available. For these spectacles commonly available three different sizes of these groups of components are sufficient. No problem with regard to any soiling of the clip-on lenses to be attached can then occur during fitting. The elastic metal wire due to its normally round cross section, offers the same flexibility in all lateral directions, so that the clip-on accessory with the clip-on lenses attached to the clasps is attachable in a simple way to almost any spectacles. The arranging of the holders for both ends of the metal wire at the top edge of the corresponding clasps offers a secure and elegant transition to the clasp.

For practical reasons, the holders consist of solder connections.

For practical purposes, the clasps are arranged as one-sided rests contacting the clip-on lenses and being mounted to the clip-on lenses. Due to the one-sided contact, clip-on spectacle lenses of practically any desirable thickness can be attached to the rests. In particular, a subsequent replacement of clip-on lenses in particular by thicker clip-on lenses is possible.

In accordance with the invention, the clip-on accessory only requires two clasps for each clip-on lens, of which the respectable upper clasp additionally forms the holder for the bridge formed from the elastic metal wire. For the arrangement of both clasps to a clip-on lens only two arrangement locations are therefore required, which also includes the mounting of the bridge. Due to the arrangement of the one clasp at the upper edge of a clip-on lens, an elegantly attached bridge extending from one clip-on lens to the other, is achieved, the lower second clasp ensuring that the clip-on lenses of the clip-on accessory cannot spread away from the spectacles. Due to the arrangement of both clasps outwardly offset with respect to the center line of each clip-on lens, a secure cohesion of the clip-on accessory in consideration of the bridge results, whereby the clip-on accessory cannot fall off of the corresponding spectacles after its attachment and which requires a flexible bending back of the bridge for its removal.

There are different possibilities for the mounting of the clasp. On the one hand, the clasps can be arranged such that they engage the clip-on lenses with a rear rest. It is, however, also possible to provide the clasps with a rest arranged on the front side of the clip-on lenses. The rest can e.g. be mounted by means of screws, rivets and by means of gluing to the clip-on lenses, whereby screws especially facilitate a later replacement.

The holding for the bridge formed from a metal wire can be formed as tubes arranged above the edges of the clip-on lenses, which are mounted to the upper clasps, preferably soldered thereto.

In order to prevent the damaging of the corresponding spectacles, respectively their frames, the clasps can for this purpose be provided with clamps bent inwardly, which are coated with a plastic tube.

The bridge can for practical purposes be arranged as an arch-shaped connection, whereby the bridge in connection with the clip-on lenses presents a particularly pleasant appearance.

Embodiments of the invention are presented in the figures.

FIG. 1 clip-on accessory with a rear rest for the clips, which are mounted to the clip-on lenses by means of screws.

Figure 1:
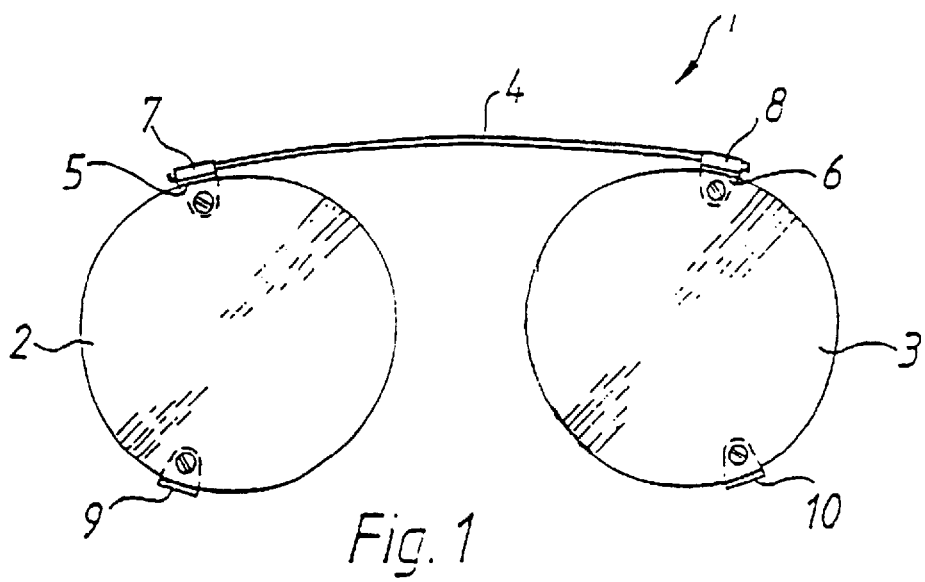

In FIG. 1 a clip-on accessory 1 is presented comprising both clip-on lenses 2 and 3, which are connected to each other by means of the bridge 4. The bridge 4 consists of an elastic metal-wire ending at both ends at the upper clasps 5 and 6. Both tubes 7 and 8 are soldered to the clasps 5 and 6, the ends of the bridge are inserted into these tubes and soldered therein. Besides both clasps 5 and 6, the clip-on accessory further comprises both lower clasps 9 and 10. Each clip-on lens 2 and 3 is, therefore, held to corresponding spectacles by means of two clasps 5/6 and 9/10. The clasps 5, 6, 9 and 10 here are mounted to the clip-on lenses 2 and 3 by means of screws, which penetrate the clip-on lenses.

Both clasps 5 and 6, respectively 9 and 10 are arranged such that, considering the length of the bridge 4, they grip the corresponding spectacle lenses from their outer region. For this purpose, respectively the upper (5/6) and the lower (9/10) clasps of a clip-on lens 2, respectively 3 are off-set outwardly with respect to the center line of the corresponding clip-on lens. In this way, a secure and easily flexible cohesion of both clip-on lenses 2 and 3 is obtained by means of the bridge 4, which at the same time is securely held to the corresponding lenses of the spectacles and can also not spread away from these.

Figure 2:
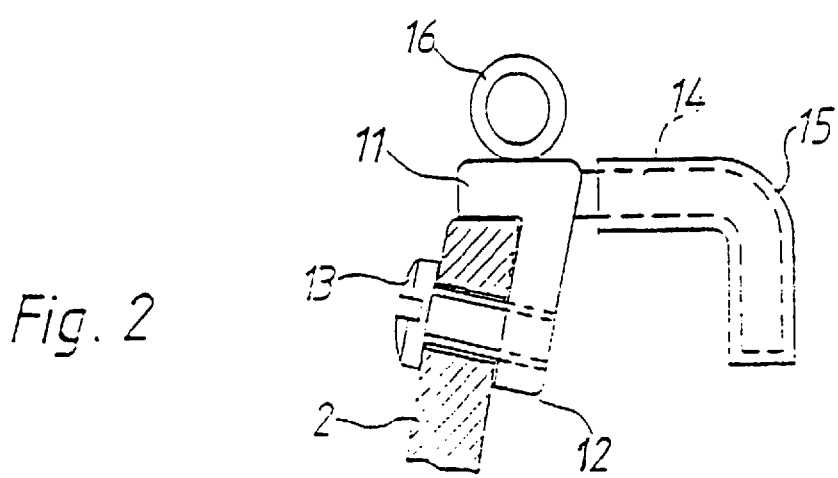
FIG. 2 shows an enlarged side view of an upper clasp according to FIG. 1.

In FIG. 2 the clasp 11, corresponding to the clasp 5 in FIG. 1, is illustrated in an enlarged side view. The clasp 11 grips over the upper edge of the clip-on lens 2 and merges into the rear rest 12, in which the screw 13 ends. The screw 13 is screwed into the rest 12 from the front side of the clip-on lens 2. For mounting the clasp 11 to the clip-on lens 2, this clasp 11, therefore, is provided with a corresponding boring. The clamp 14 extends from the clasp 11, whereby the clamp 14 is clipped over a spectacle lens not illustrated and is held thereto. In order to prevent damaging of the lens of the spectacles or its edge, clamp 14 is coated with a plastic tube 15. Further, the tube 16 is soldered to the clasp 11, which serves the holding of bridge 4 according to FIG. 1.

Figure 3:
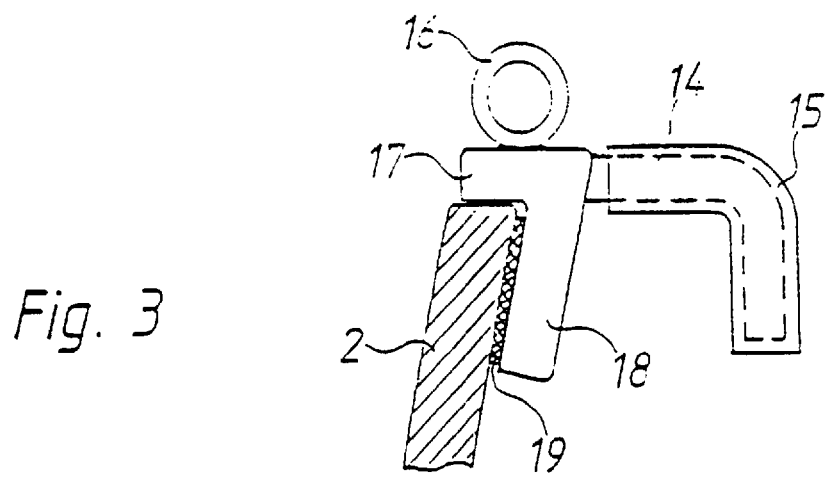
FIG. 3 shows an enlarged side view of a similar clasp, which is glued to the rear side of a clip-on lens.

FIG. 3 shows a structure of clasp 17 similar to the arrangement according to FIG. 2, which here ends in the rear rest 18. The rest 18 is mounted to the rear side of the clip-on lens 2 by means of the glue layer 19. Otherwise, the clasp 17 corresponds to the clasp according to FIG. 2.

Figure 4:
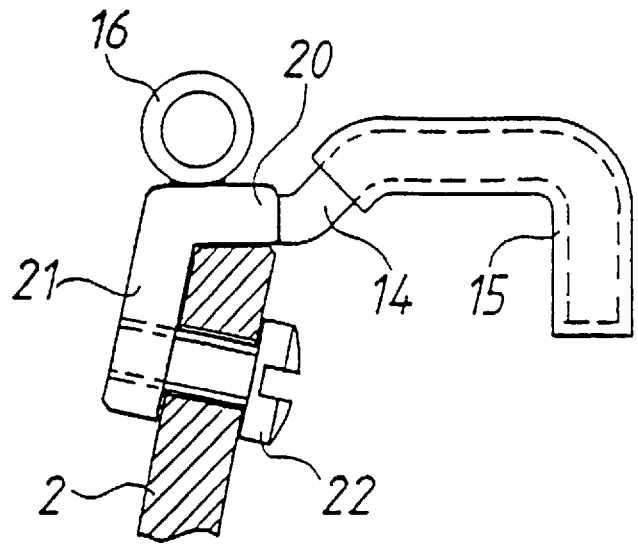
FIG. 4 shows an enlarged side view of an upper clasp with a rest engaging the front side of the clip-on lens and a mounting screw.

FIG. 4 shows an embodiment of a clasp 20 ending in a front rest 21. Here, the screw 22 is inserted into the clip-on lens 2 from the rear side and screwed into the rest 21. Similarly, a gluing to the clip-on lens 2 can obviously also occur similar to the arrangement according to FIG. 3. As with the embodiments illustrated in FIG. 2 and 3, the clasp 20 is provided with the clamp 14 coated by the plastic tube 15.

Figure 5:
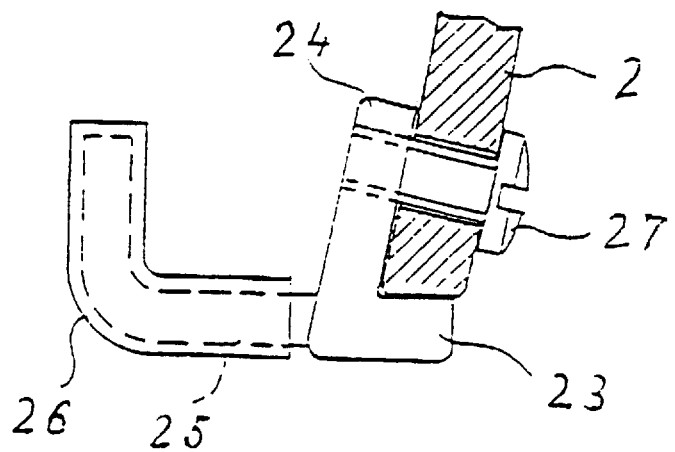
FIG. 5 shows an enlarged side view of a lower clasp.

FIG. 5 shows the lower clasp 23, which is formed corresponding to the upper clasp illustrated in FIG. 2, however, without a tube. The clasp 23 merges into the rest 24, which here engages the front side of the clip-on lens 2. The lower clasp 23, therefore, compliments the upper clasp 20 illustrated in FIG. 4. The lower clasp 23 comprises the clamp 25 with the plastic tube 26. It is mounted to the clip-on lens 2 by means of the screw 27.

Additionally, it should be noted that the clip-on accessory is particularly suitable to be made available to the optician as a kit, consisting of the above-described components, who then with little manipulation can assemble and adapt the clip-on accessory from such a kit for present spectacles.

I claim:

1. Clip-on spectacle accessory with rimless clip-on lenses which are each held by a number of clasps to the spectacle lenses, wherein an upper clasp is directly secured to the top edge of each clip-on lens, which at the same time forms a holder for an elastic bridge to the other clip-on lens, such that the lateral cohesion of both clip-on lenses is determined by the upper clasps and the bridge, and a lower clasp is directly secured to the lower edge of each clip-on lens preventing the clip-on accessory from spreading away from the lenses of the spectacles, wherein the upper and the lower clasp of a clip-on lens are outwardly off set with respect to the center line of the clip-on lens, wherein the bridge is formed from an elastic metal wire which ends at both ends within said holders which are in metallic connection with the top edge of the corresponding clasp;

each holder consists of a solder connection; and the clasps merge into one-sided rests contacting the clip-on lenses and being mounted to the clip-on lenses.

2. Clip-on spectacle accessory with rimless clip-on lenses which are each held by a number of clasps to the spectacle lenses, wherein an upper clasp is directly secured to the top edge of each clip-on lens, which at the same time forms a holder for an elastic bridge to the other clip-on lens, such that the lateral cohesion of both clip-on lenses is determined by the upper clasps and the bridge, and a lower clasp is directly secured to the lower edge of each clip-on lens preventing the clip-on accessory from spreading-away from the lenses of the spectacles, wherein the upper and the lower clasp of a clip-on lens are outwardly off-set with respect to the center line of the clip-on lens, wherein the bridge is formed from an elastic metal wire which ends at both ends within said holders which are in metallic connection with the top edge of the corresponding clasp; and the clasps merge into one-sided rests which contact the clip-on lenses only on one side and which are mounted to the clip-on lenses.

3. Clip-on spectacle accessory according to claim 1 or 2, wherein the rests are mounted to the clip-on lenses by means of screws.

4. Clip-on spectacle accessory according to claim 1 or 2, wherein the rests are mounted to the clip-on lenses my means of rivets.

5. Clip-on spectacle accessory according to claim 1 or 2, wherein the clasps merge into rests glued to the clip-on lenses.

6. Clip-on spectacle accessory with rimless clip-on lenses, each clip-on lens having a front side and a rear side and each are each held by a number of clasps to the spectacle lenses, wherein an upper clasp is directly secured to the top edge of each clip-on lens, which at the same time forms a holder for an elastic bridge to the other clip-on lens, such that the lateral cohesion of both clip-on lenses is determined by the upper clasps and the bridge, and a lower clasp is directly secured to the lower edge of each clip-on lens preventing the clip-on accessory from spreading-away from the lenses of the spectacles, wherein the upper and the lower clasp of a clip-on lens are outwardly off-set with respect to the center line of the clip-on lens, wherein the bridge is formed from an elastic metal wire which ends at both ends within said holders which are in metallic connection with the top edge of the corresponding clasp; and the clasps merge into one-sided rests which contact the clip-on lenses only on the rear side and which are mounted to the clip-on lenses.

7. Clip-on spectacle accessory with rimless clip-on lenses, each clip-on lens having a front side and a rear side and each are each held by a number of clasps to the spectacle lenses, wherein an upper clasp is directly secured to the top edge of each clip-on lens, which at the same time forms a holder for an elastic bridge to the other clip-on lens, such that the lateral cohesion of both clip-on lenses is determined by the upper clasps and the bridge, and a lower clasp is directly secured to the lower edge of each clip-on lens preventing the clip-on accessory from spreading-away from the lenses of the spectacles, wherein the upper and the lower clasp of a clip-on lens are outwardly off-set with respect to the center line of the clip-on lens, wherein the bridge is formed from an elastic metal wire which ends at both ends within said holders which are in metallic connection with the top edge of the corresponding clasp; and the clasps merge into one-sided rests which contact the clip-on lenses only on the front side and which are mounted to the clip-on lenses.

8. Clip-on spectacle accessory according to claims 1, 2, 6, or 7 wherein the rests contact the clip-on lenses on their rear side.

9. Clip-on spectacle accessory according to any of the claims 1, 2, 6, or 7 wherein that the rests contact the clip-on lenses on the front side.

10. Clip-on spectacle accessory according to any one of the claims 1, 2, 6, or 7 wherein tubes for holding the ends of the bridge are mounted to the upper clasps above the upper edges.

11. Clip-on spectacle accessory according to claim 10, wherein the tubes are soldered to the clasps.

12. Clip-on spectacle accessory according to any one of the claims 1, 2, 6, or 7 wherein the clasps comprise inwardly bent clamps coated with a plastic tube.

13. Clip-on spectacle accessory according to any one of the claims 1, 2, 6, or 7 wherein the bridge is arranged as an arch-shaped connection.

* * * * *